US012689266B2

(12) United States Patent (10) Patent No.: US 12,689,266 B2
Fichtner-Pflaum et al. (45) Date of Patent: Jul. 21, 2026

(54) ELECTRIC MOTOR HAVING AN ANGULAR POSITION SENSOR

(71) Applicant: SEW-EURODRIVE GMBH & CO. KG, Bruchsal (DE)

(72) Inventors: Gerolf Fichtner-Pflaum, Kraichtal-Unteröwisheim (DE); Manuel Heil, Eggenstein-Leopoldshafen (DE); Woldemar Ott, Forst (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 438 days.

(21) Appl. No.: 18/566,299

(22) PCT Filed: May 17, 2022

(86) PCT No.: PCT/EP2022/025232
§ 371 (c)(1),
(2) Date: Dec. 1, 2023

(87) PCT Pub. No.: WO2022/253458
PCT Pub. Date: Dec. 8, 2022

(65) Prior Publication Data
US 2024/0146157 A1 May 2, 2024

(30) Foreign Application Priority Data

Jun. 1, 2021 (DE) .......................... 102021002806.6

(51) Int. Cl.
*H02K 11/21* (2016.01)
*H02K 5/173* (2006.01)
*H02K 11/33* (2016.01)
(52) U.S. Cl.
CPC ........... *H02K 11/21* (2016.01); *H02K 5/1732* (2013.01); *H02K 11/33* (2016.01); *H02K 2211/03* (2013.01)

(58) Field of Classification Search
CPC ...... H02K 11/21; H02K 11/33; H02K 5/1732; H02K 2211/03
See application file for complete search history.

(56) References Cited

U.S. PATENT DOCUMENTS 11,674,557 B2 6/2023 Fichtner-Pflaum

FOREIGN PATENT DOCUMENTS

DE 102008037737 A1 3/2009
DE 102015207492 A1 10/2016
(Continued)

OTHER PUBLICATIONS

International Search Report issued in corresponding International Application No. PCT/EP2022/025232 dated Oct. 4, 2022, pp. 1-2, English Translation.
(Continued)

*Primary Examiner* — Terrance L Kenerly
(74) *Attorney, Agent, or Firm* — Carter, DeLuca & Farrell LLP

(57) ABSTRACT

An electric motor includes an angular position sensor, a housing part, a bearing, e.g., a floating bearing, and a rotor shaft. A bearing seat is provided on the housing part, in which bearing seat the bearing, e.g., the outer ring of the bearing, is received. The inner ring of the bearing is arranged on the rotor shaft and is fixed in the axial direction on the rotor shaft. The angular position sensor includes a first printed circuit board, and a spring element supported on the housing part presses onto the first printed circuit board. At least one tongue region of a part connected to the first printed circuit board bears against the outer ring.

36 Claims, 10 Drawing Sheets

(56)        References Cited

FOREIGN PATENT DOCUMENTS

DE      102019002960 A1    11/2019
DE      102019127241 A1     4/2021
EP           0115538 A1     8/1984

OTHER PUBLICATIONS

International Report on Patentability issued in corresponding International Application No. PCT/EP2022/025232, dated Nov. 21, 2023, pp. 1-8, English Translation.

90

ELECTRIC MOTOR HAVING AN ANGULAR POSITION SENSOR

FIELD OF THE INVENTION

The present invention relates to an electric motor having an angular position sensor.

BACKGROUND INFORMATION

In certain conventional systems, sensors can react sensitively to environmental influences.

A bearing arrangement is described in German Patent Document No. 10 2019 127 241.

An electrical machine is described in German Patent Document No. 10 2015 207 492.

SUMMARY

Example embodiments of the present invention provide for robust angular position detection in an electric motor.

According to example embodiments of the present invention, an electric motor includes an angular position sensor, and the electric motor includes comprises a housing part, a bearing, e.g., a floating bearing, and a rotor shaft. A bearing seat is provided on the housing part, in which bearing seat the bearing, e.g., the outer ring of the bearing, is received. The inner ring of the bearing is arranged on the rotor shaft and is fixed in the axial direction on the rotor shaft, e.g., by a shaft collar and a retaining ring. The angular position sensor includes a first printed circuit board, and a spring element, which is supported on the housing part, e.g., an annular spring, leaf spring, shaped spring or metal bellows, presses onto an alignment element in which the first printed circuit board is received. At least one tongue region of the alignment element which is connected to the first printed circuit board bears against the outer ring, e.g., axially delimits the outer ring.

Thus, precise detection of the angular position is possible even in the case of temperature changes resulting in changes in the length of the rotor shaft. The bearing is arranged as a non-locating bearing, and another bearing of the rotor shaft is arranged as a fixed bearing. A region of the housing, which encloses the region of the motor located axially between the fixed bearing and the non-locating bearing in a housing-forming manner, is formed of a different material than the rotor shaft, so that the material of the rotor shaft has a different coefficient of linear thermal expansion than the material of the region. For example, the rotor shaft is formed of steel, and the region is formed of aluminum. Thus, the bearing arranged on the rotor shaft and also the plate part bearing against the bearing are displaced. Since the sensor for detecting a coding disk or coding, which is arranged on the plate part, is arranged on the printed circuit board, which, while being arranged in a rotationally fixed manner to the housing part, is arranged in immovable manner from the spring part relative to the outer ring, the distance between the plate part and the first printed circuit board is constant. This allows the angular position sensor to be configured to be robust against temperature changes or other influences that shift the rotor shaft relative to the housing part in an axial direction.

According to example embodiments, the first printed circuit board is arranged as a ring, e.g., in which the associated ring axis is aligned coaxially with the axis of rotation of the rotor shaft. Thus, the first printed circuit board can be arranged in the axial region of the bearing. This provides a compact and robust configuration.

According to example embodiments, the direction of the normal of the printed circuit board plane is aligned parallel to the axis of rotation of the rotor shaft. Thus, detection can be readily performed.

According to example embodiments, the first printed circuit board is received in the alignment element, which has a plurality of tongue regions spaced apart from one another in the circumferential direction, e.g., in relation to the axis of rotation of the rotor shaft, each of which tongue regions bears against the outer ring of the bearing. Thus, the printed circuit board is arranged in a protected manner, and that a uniform displacement of the outer ring can be achieved.

According to example embodiments, the alignment element is connected to the first printed circuit board by at least one screw, e.g., either by screwing the screw into the alignment element or by inserting the screw through the alignment element and screwing in a nut that bears against the alignment element. For example, the screw head of the screw presses onto the printed circuit board and/or bears against the printed circuit board on the side of the printed circuit board facing away from the part. Thus, a simple and cost-effective configuration can be achieved.

According to example embodiments, the region covered by the first printed circuit board in the axial direction includes or is included in the region covered by the bearing in the axial direction. Thus, the motor has a compact and robust configuration.

According to example embodiments, the first printed circuit board is radially spaced apart from the bearing. Thus, the electric motor has a robust and compact configuration.

According to example embodiments, the bearing seat is interrupted in the circumferential direction, so that a respective tongue region projects radially through the respective interrupted region and has a spatial region available for movement in the axial direction. Thus, in the region of the bearing seat, the first printed circuit board is aligned relative to the outer ring. Thus, a robust and compact configuration can be achieved.

According to example embodiments, the spring element is configured as a guide for the first printed circuit board, e.g., the spring element is arranged as a shaped spring, or a screw screwed into the housing part is arranged as a guide for the first printed circuit board, or a sliding bush arranged on a screw screwed into the housing part is arranged as a guide for the first printed circuit board. Thus, precise alignment can be performed at low cost.

According to example embodiments, a second printed circuit board arranged in the form of a ring is connected to the first printed circuit board, a spacer element is arranged between the first and second printed circuit board, and the first printed circuit board is arranged parallel and coaxial to the second printed circuit board. Thus, a large number of components for evaluating the sensor signals can be fitted on the printed circuit boards.

According to example embodiments, a plate part arranged on the rotor shaft bears against a shaft shoulder of the rotor shaft, and the inner ring bears against the plate part on the side of the plate part facing away from the shaft shoulder. The inner ring is axially delimited by a retaining ring arranged in an annular groove of the rotor shaft or the inner ring is axially delimited by a retaining ring arranged in an annular groove of the rotor shaft via a tappet arranged axially between the inner ring and the retaining ring and connected to the rotor shaft in a rotationally fixed manner, e.g., the retaining ring bears against the tappet and the tappet bears against the inner ring.

Thus, the motor can be provided with or without a tappet, i.e., with or without a brake. For example, the inner ring and the plate part are positioned on the rotor shaft in an axially fixed manner, i.e., axially fixed, and thus the stability against thermally induced extensions, for example, is achieved.

According to example embodiments, the plate part is arranged as a turntable, e.g., the plate part is arranged as a rotating body. Thus, ready production is possible, and balancing is not necessary.

According to example embodiments, the plate part has a coding which can be detected by a sensor arranged on the first printed circuit board, or the plate part receives, e.g., in an axial recess, a coding disk, the coding of which can be detected by a sensor arranged on the first printed circuit board. Thus, fine angle detection can be performed. A permanent magnet attached to the plate section in addition to the coding makes it possible to determine the total number of revolutions completed. The angular position sensor can thus be arranged as a multiturn encoder.

According to example embodiments t, the plate part is made of a ferromagnetic material, or the plate part is made of a soft magnetic material, e.g. Thus, it is possible to deflect or shield magnetic fields of the stator.

According to example embodiments, a permanent magnet is fastened to the plate part. Thus, the number of revolutions can be detected.

According to example embodiments, the housing part, together with at least one stator housing part, encloses an interior region including the stator winding of the electric motor in a housing-forming manner, which interior region also includes the plate part and the first printed circuit board, e.g., without an interposed seal between the stator winding and the first printed circuit board. Thus, the sensor can be arranged in an integrated manner in the interior region of the stator.

According to example embodiments, the rotor shaft protrudes through the magnet body and is connected to a fan wheel in a rotationally fixed manner. Thus, efficient cooling of the brake and motor is made possible by the cooling air flow being conveyed along the outside of the brake and along the outside of the stator.

According to example embodiments, an impulse wire sensor, e.g., a Wiegand sensor, is fitted on the first printed circuit board. For example, the distance between the plate part and the impulse wire sensor is selected such that the rotation of the permanent magnet past the impulse wire sensor can be detected by the impulse wire sensor. Thus, not only can the number of revolutions be determined, but the evaluation electronics can also be supplied from the energy pulse generated when the permanent magnet is rotating past if a capacitance for buffering is arranged on the first printed circuit board.

According to example embodiments, a braking surface is provided on the housing part on the side of the housing part facing away from the plate part in the axial direction or is provided on a metal part, e.g., a sheet metal part, connected to the housing part. Thus, the electric motor can be provided with a brake.

According to example embodiments, a brake pad carrier is connected to the tappet in a rotationally fixed manner but is displaceable in the axial direction. A magnetic body receiving a coil is connected to the housing part in a rotationally fixed, e.g., fixed, manner, an armature disk is connected to the magnet body in a rotationally fixed manner but is displaceable in the axial direction, the armature disk is arranged in the axial direction between the brake pad carrier and the magnet body, and further spring elements supported on the magnet body press on the armature disk. For example, when the coil is energized, the armature disk is pulled toward the magnet body against the spring force generated by the other spring elements, e.g., so that when the coil is not energized, the armature disk is pressed by the other spring elements onto the brake pad carrier, which is thus pressed onto the braking surface, e.g., so that braking occurs. Thus, the brake is applied automatically in the event of a power failure. In addition, the housing part is arranged between the brake and the angular position sensor and is, for example, made of metal, e.g., of a ferromagnetic material. In this manner, the magnetic field of the brake is dissipated and thus kept away from the angular position sensor.

Further features and aspects of example embodiments of the present invention are e explained in more detail below with reference to the appended schematic Figures.

DETAILED DESCRIPTION

Figure 1:
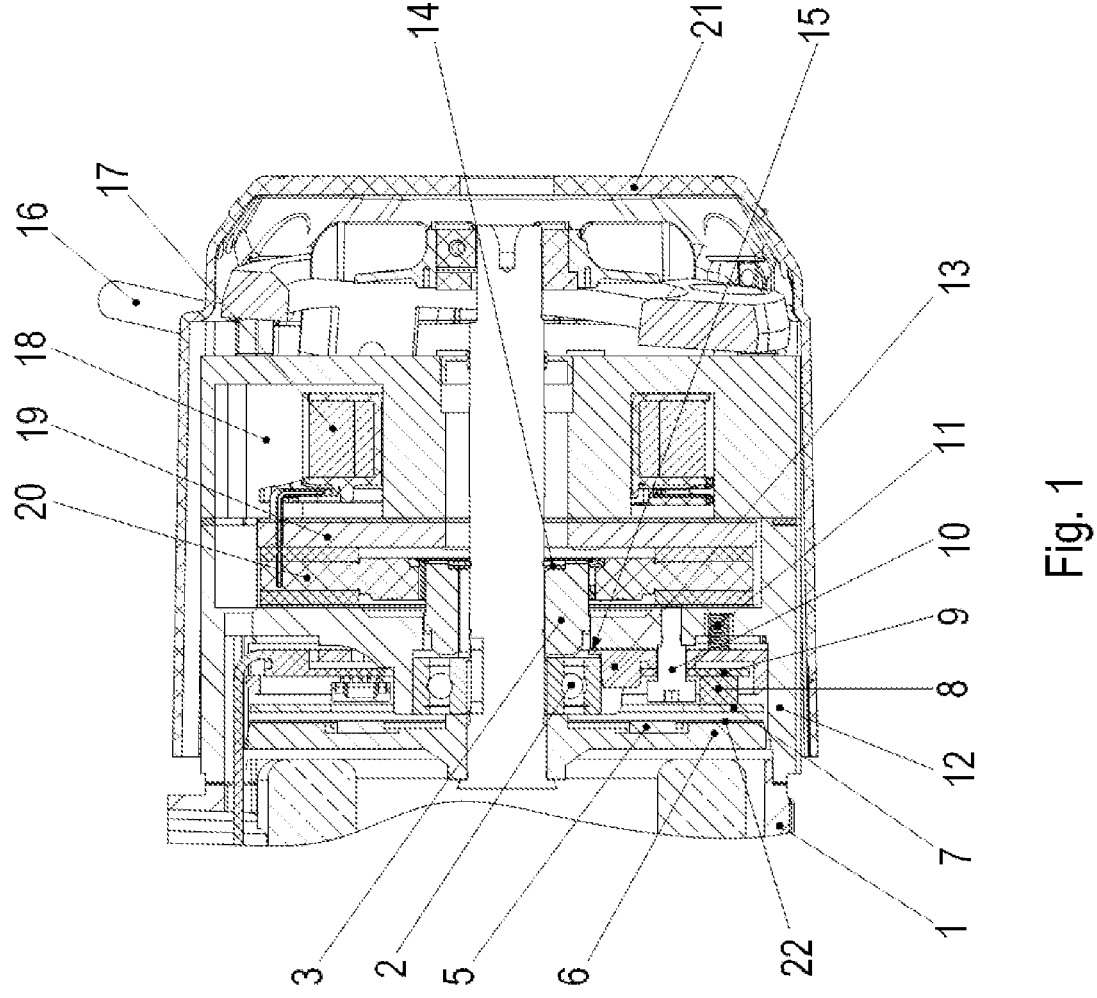
FIG. 1 is a cross-sectional view through the B-side region of an electric motor with an angle sensor and brake arranged in an integrated manner in the electric motor.
Figure 2:
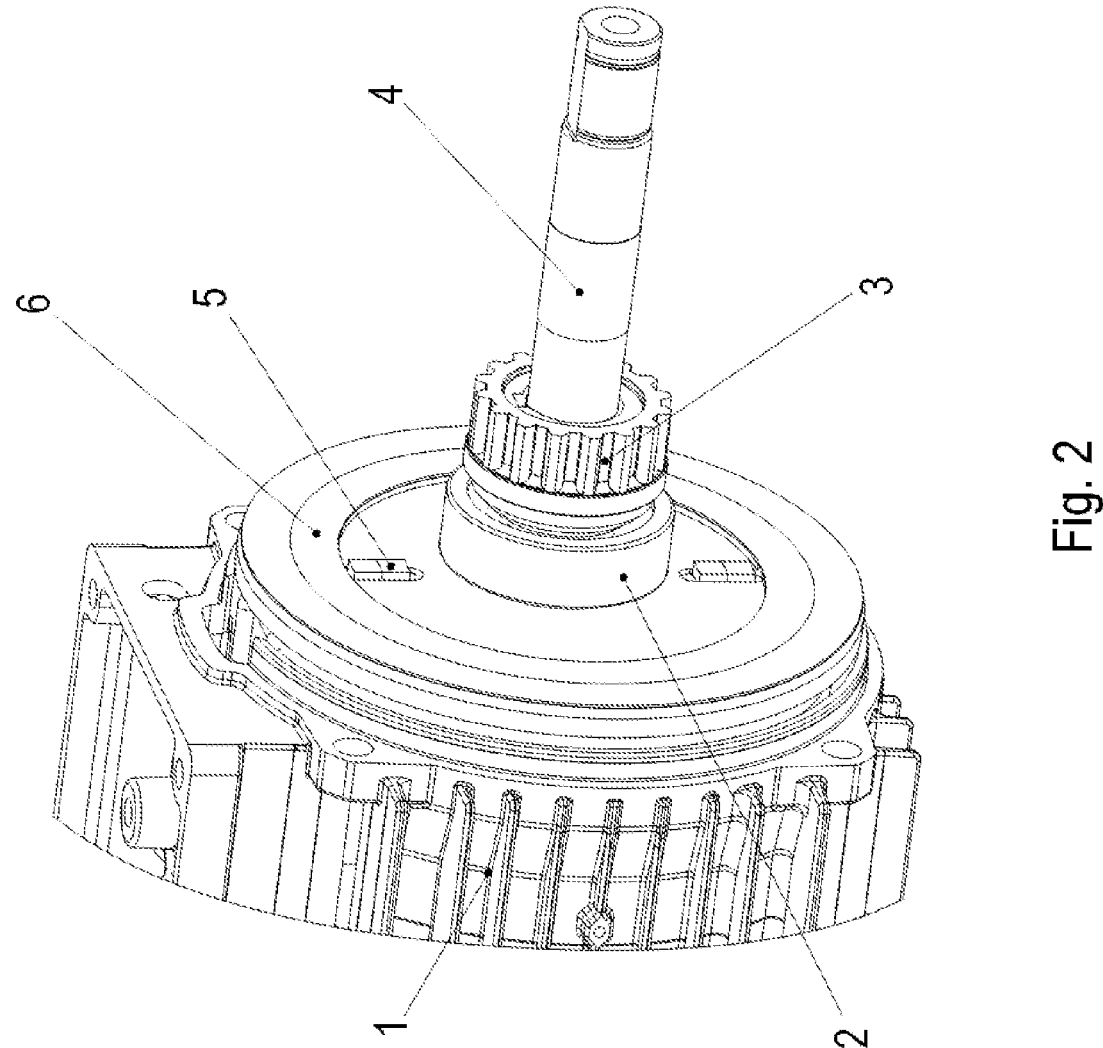
In FIG. 2, the region is illustrated in a perspective view with the brake removed, e.g., so that the non-rotating partial region of the angle sensor is visible.
Figure 3:
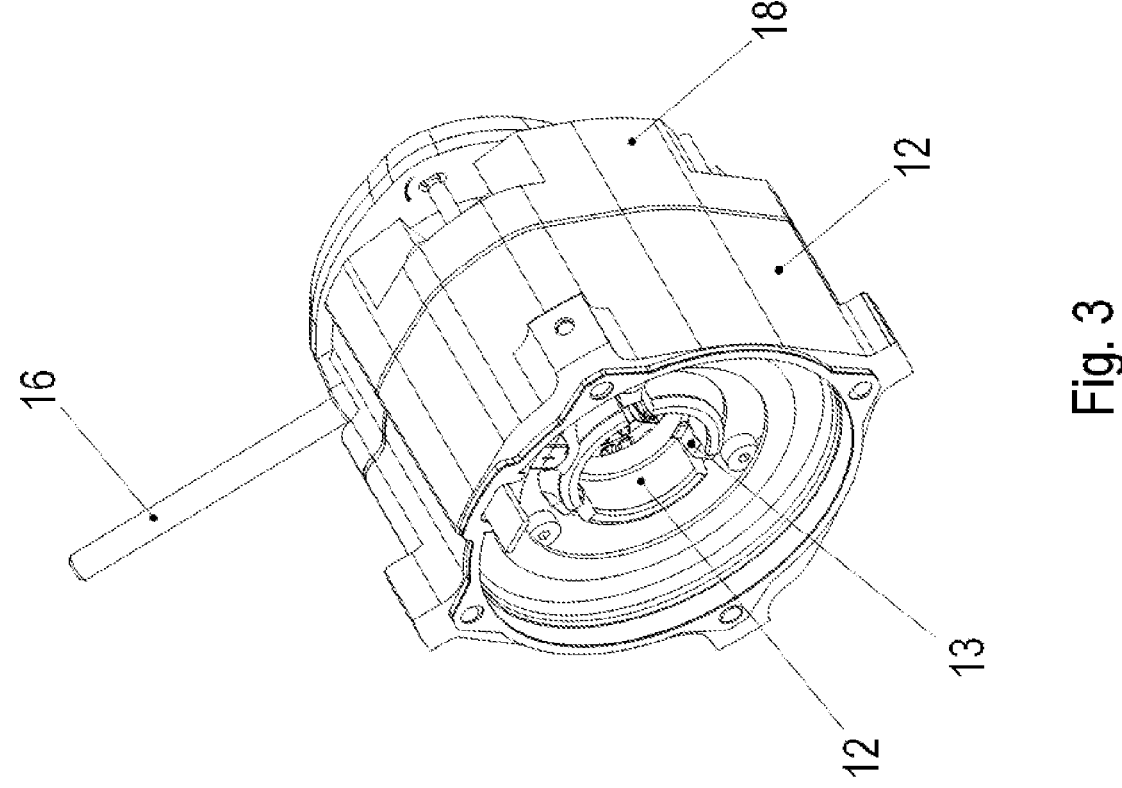
In FIG. 3, the part removed in FIG. 2, which has the brake, is illustrated in a perspective oblique view, e.g., the pre-assembled brake with the non-rotating partial region of the angle sensor.
Figure 4:
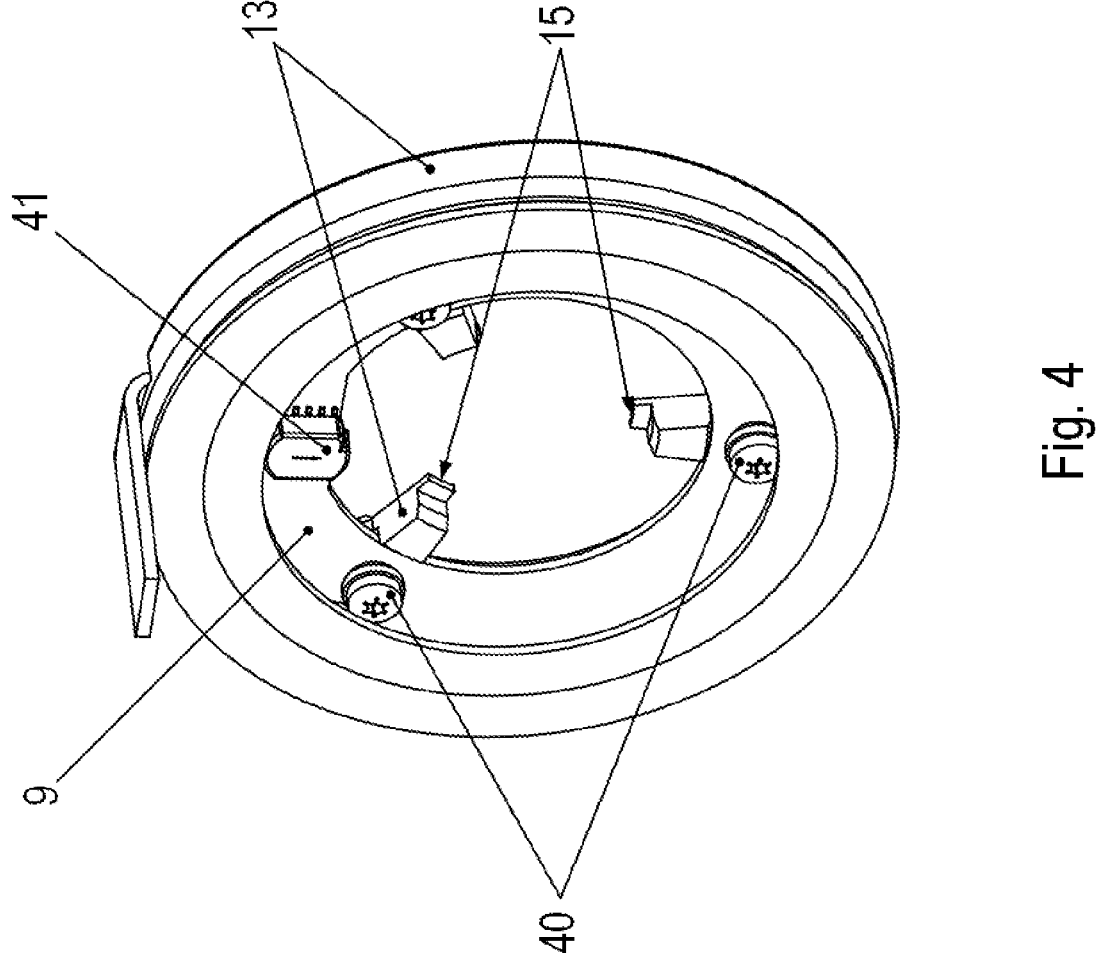
FIG. 4 is a perspective view of the printed circuit boards of the angle sensor which are connected to the housing of the electric motor in a rotationally fixed manner.

As illustrated in FIGS. 1 to 4, the electric motor has a stator housing part 1 which is connected at its first, e.g., B-side axial end region to a first housing part 12, e.g., a flange part. At its second, e.g., A-side axial end region, the stator housing part 1 is connected to a second housing part, e.g., a flange part.

A bearing 2 for the rotatable mounting of the rotor shaft 4 is received in the housing part 12. The bearing 2 is, for example, arranged as a non-locating bearing, whereas a bearing received in the second housing part is arranged as a fixed bearing.

Since a different material is used for the rotor shaft 4 than for the stator housing part 1, the axial position of the bearing 2 connected to the rotor shaft depends on the temperature.

To axially fix the bearing 2 on the rotor shaft 4, a plate part 6 is arranged on the rotor shaft 4, which is placed against a shaft shoulder of the rotor shaft 4. The inner ring of the bearing 2 bears against the plate part 6 on the side of the plate part 6 facing away from the shaft shoulder in the axial direction. A tappet 3 bears against the side of the inner ring of the bearing 2 facing away from the plate part 6 in the axial direction, e.g., against the inner ring of the bearing 2.

A retaining ring 14 received in an annular groove of the rotor shaft 4 bears against the side of the tappet 3 facing away from the plate part 6 in the axial direction.

This means that not only the inner ring of the bearing 2 but also the plate part 6 and the tappet 3 are axially secured and axially fixed to the rotor shaft 4.

For example, the plate part 6 and the tappet 3 are connected to the rotor shaft 4 in a rotationally fixed, e.g., form-fitting, manner. The inner ring of the bearing 2 is connected to the rotor shaft 4 in a force-locking and/or material-locking manner.

The outer ring of the bearing 2 is received on a bearing seat provided in the housing part 12. The bearing seat is configured such that the outer ring is arranged in an axially displaceable manner, i.e., for example, has play in the axial direction, e.g., the outer ring is received with little play by a transition fit.

In this manner, when the inner ring of bearing 2 is displaced, the outer ring can be displaced along with it.

A first printed circuit board 9 is received by an alignment element 13, e.g., a carrier part. The alignment element 13 is acted upon in the axial direction by a spring element 11 supported on the housing part 12 with a spring force generated by the spring element 11. The spring element 11 supported on the housing part 12 thus presses on the first printed circuit board 9 via the alignment element 13, e.g., the carrier part.

The first printed circuit board 9 has a ring-like configuration and is equipped with at least one Wiegand sensor, by which it can be detected when a permanent magnet 5 fastened to the plate part 6 rotates past. For example, even at least one electronic circuit whose components are also fitted on the first printed circuit board 9. The number of revolutions is determined by detecting the permanent magnet 5. A fine angle determination is carried out by excitation of the conductive paths of the circuit board 22.

For example, the permanent magnet 5 is attached to the plate part 6 in a material-locking, e.g., adhesive-bonded, manner, e.g., in an axial recess of the plate part. A circuit board 22, whose conductive paths interact with the stationary part of the angle sensor for fine angle detection, is fastened to the plate part 6. For example, the circuit board 22 covers the permanent magnet 5.

A second printed circuit board 7, which is also arranged in the form of a ring and is coaxially aligned with the first printed circuit board 6, is spaced apart from one another in the axial direction by distance elements 8, e.g., spacers, interposed between the two printed circuit boards 6 and 7. The two printed circuit boards 6 and 7 are connected by an electrical plug connection.

The alignment element 13 is fastened with the first printed circuit board 6 by screws 40, in which respective tongue regions 15 are provided on the alignment element 13, which are spaced apart from one another in the circumferential direction and each bear against an axial end face of the outer ring of the bearing 2, i.e., for example, against a flat surface section of the outer ring, in which the direction of the normal of this surface section is aligned parallel to the axial direction.

As a result of the spring force generated by the spring element 11, the outer ring is pressed by the tongue regions 15 in an axial direction, e.g., to reduce the play of the bearing.

The bearing seat formed on the housing part 12 for the outer ring of the bearing 2 is interrupted in the circumferential direction for each of the tongue regions 15. Thus, there is an axial gap available to each tongue region 15, within which the respective tongue region 15 has axial play.

For example, the position of the plate part 6 and the inner ring of the bearing 2 is thus axially displaced during thermal extension of the rotor shaft 4, but the distance between the first printed circuit board 9 and the plate part 6 remains unchanged, since the first printed circuit board 9 is pressed onto the outer ring by the spring element 11 supported on the housing part 12 by the alignment element 13 connected to the first printed circuit board 9, e.g., by the tongue regions 15 of the alignment element 13, and is thus moved axially with the inner ring accordingly. The axial dimensional tolerances that arise between the rotor shaft assembly and the housing assembly are, for example, also compensated for by this spring-loaded support on the outer ring of the bearing.

During each rotation, the permanent magnet 5 arranged on the plate part 6 has a minimum distance to the Wiegand sensor for a short time. For example, this minimum distance also remains constant. In addition, the circuit board 22, which is arranged as a coding disk, is received in the plate part 6, which is, for example, arranged as a turntable with a corresponding axial recess, and the circuit board 22 is connected to the plate part 6 in a rotationally fixed manner. By at least one sensor fitted on the first or second printed circuit board 9, 7, the information encoded by the coding disk is, for example, detected inductively or optically and used by an evaluation unit arranged on the first and/or second printed circuit board 7, 9 to determine the fine-angle position information. For example, the coding disk has one or more tracks of surface regions which alternate in the circumferential direction, reflecting or transmitting optically to different degrees.

An angular position sensor is thus arranged within the stator region of the electric motor, i.e., within the housing enclosing the stator. For example, the angular position sensor is not particularly sealed or particularly shielded from the spatial region filled by the stator winding of the stator. However, an annular gap is provided between the radial outer edge of the plate part 6 and the housing part 12.

However, if the plate part 6 is made of ferromagnetic material or even soft magnetic material, e.g., aluminum, a magnetic shielding effect can be achieved, e.g., also if the underlying mechanisms for the shielding are different.

A braking surface is provided on the side of the housing part 12 facing away from the plate part 6. For example, this can be arranged as a sheet metal part that bears against the housing part 12, or alternatively directly as a finely machined surface area of the housing part 12.

A brake pad carrier 20 is provided with its internal toothing on the external toothing of the tappet 3, so that the two toothings engage with each other such that the brake pad carrier 20 is movable back and forth in the axial direction, while being connected in a form-fit, i.e., rotationally fixed manner in the circumferential direction.

An armature disk 19 is arranged on the side facing away from the housing part 12. The armature disk is connected in a rotationally fixed manner to a magnet body 18, in which an energizable coil 17 is received. The armature disk is arranged relative to the magnet body 18 so as to be axially movable back and forth. For example, axially extending bolts are connected to the magnet body for this purpose, which are spaced apart from each other in the circumferential direction and protrude through corresponding cutouts in the armature disk.

The magnet body is connected to the housing part 12 in a fixed manner by the bolts or alternatively directly, i.e., for example, also in a rotationally fixed manner.

A spring force is applied to the armature disk by further spring elements supported on the magnet body 18. The other spring elements supported on the magnetic body 18 thus press the armature disk 19 toward the brake pad carrier 20. When the coil 17 is energized, the armature disk 19 is pulled toward the magnet body 18 against the spring force generated by the other spring elements supported on the magnet body 18, so that the brake pad carrier 20 can rotate freely and the brake is thus released. When the coil 17 is not energized, the brake is applied, since the other spring elements supported on the magnet body 18 press the armature disks onto the brake pad carrier 20, which is thus pressed onto the braking surface on its side facing away from the armature disk 19.

The frictional torque is generated by the brake pads arranged on both sides of the brake pad carrier 20, with the braking surface on one side and with the armature disk 19 on the other side.

For example, the rotor shaft protrudes through a cutout in the magnet body 18 and, at its end region protruding on the side of the magnet body 18 facing away from the stator, is connected in a rotationally fixed manner to a fan wheel.

A cover 21, e.g., a fan cover, connected to the housing part 12 encloses the fan wheel and the brake. On its side facing away from the stator, the cover 21 has a fan grill formed from grill openings, through which the intake air can be drawn in.

The armature disk 19 is made of a ferromagnetic material.

A screw is used as the guide part 10 for the first printed circuit board 9, which screw is screwed into the housing part 12.

Figure 6:
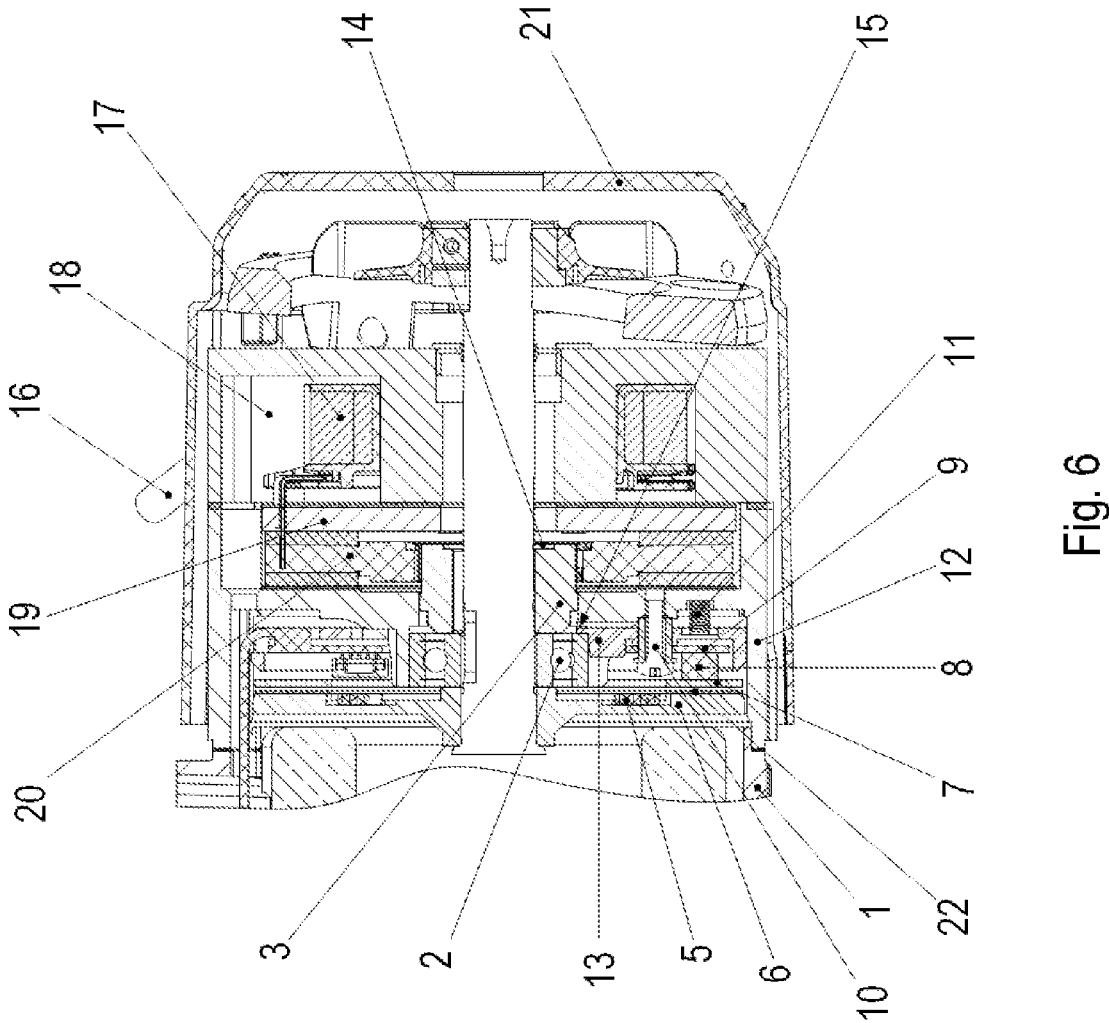
In FIG. 6, in contrast to FIG. 1, an axial gap is prevented by a sufficiently high spring force.
Figure 7:
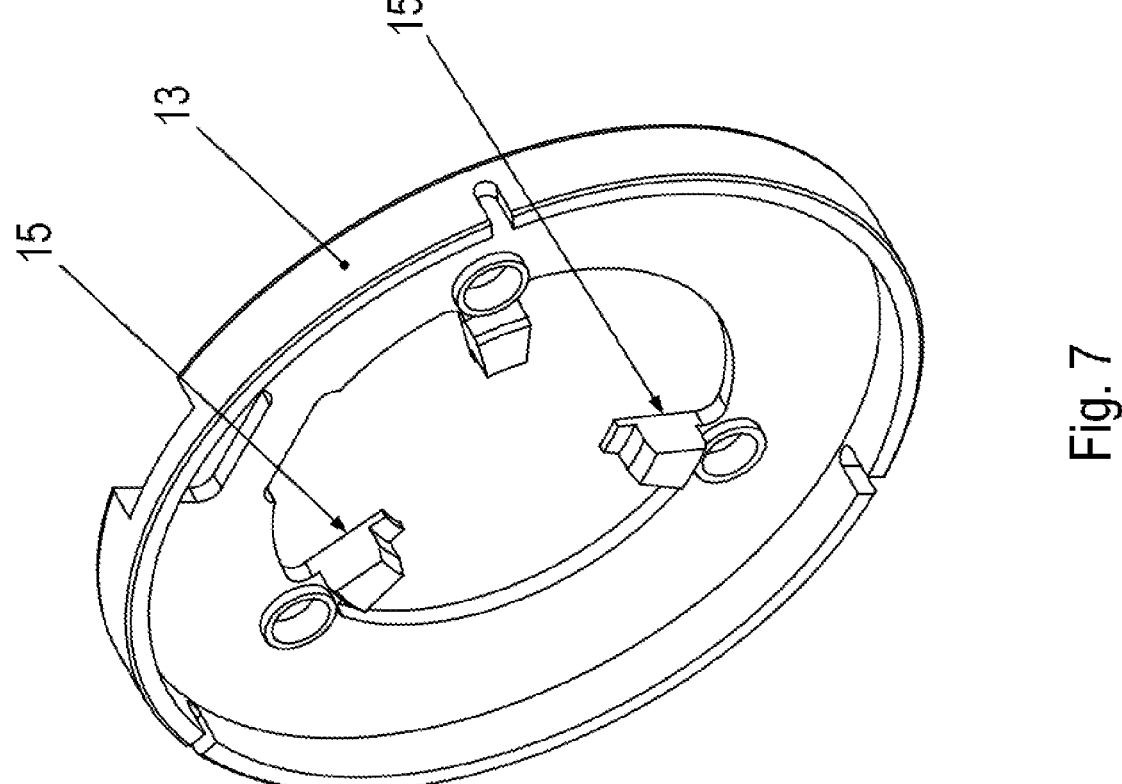
FIG. 7 is a perspective view, from a first viewing direction, of an alignment element.
Figure 8:
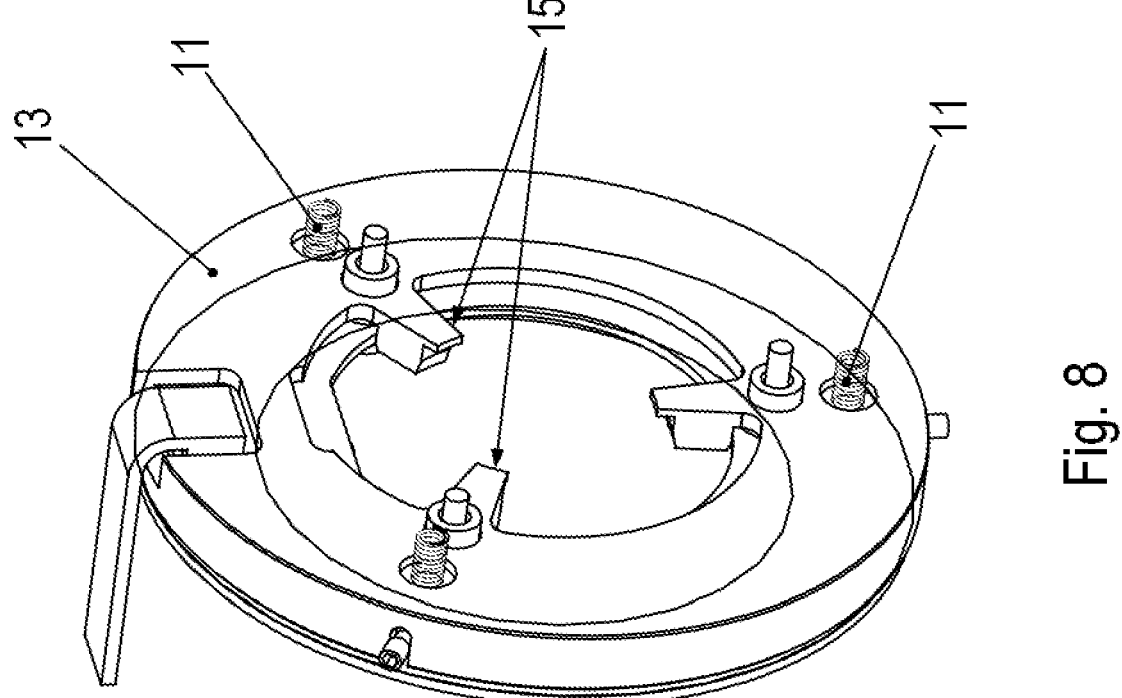
In FIG. 8, the alignment element is illustrated in a perspective view from a second viewing direction, in which spring elements 11 pressing on the alignment element are present.

FIG. 1 illustrates an axial gap between the respective tongue region 15 and the outer ring of the bearing 2. For example, this is not required if the spring element 11 applies a sufficiently strong spring force to the first printed circuit board 9. This is illustrated in FIG. 6.

The spring elements 11 press on the alignment element, and the contact surface is arranged recessed in the axial direction on the alignment element 13.

According to example embodiments, no brake is arranged on the electric motor. In such a configuration, the tappet 3 is also omitted and the retaining ring 14 bears directly against the inner ring of the bearing 2.

Figure 5:
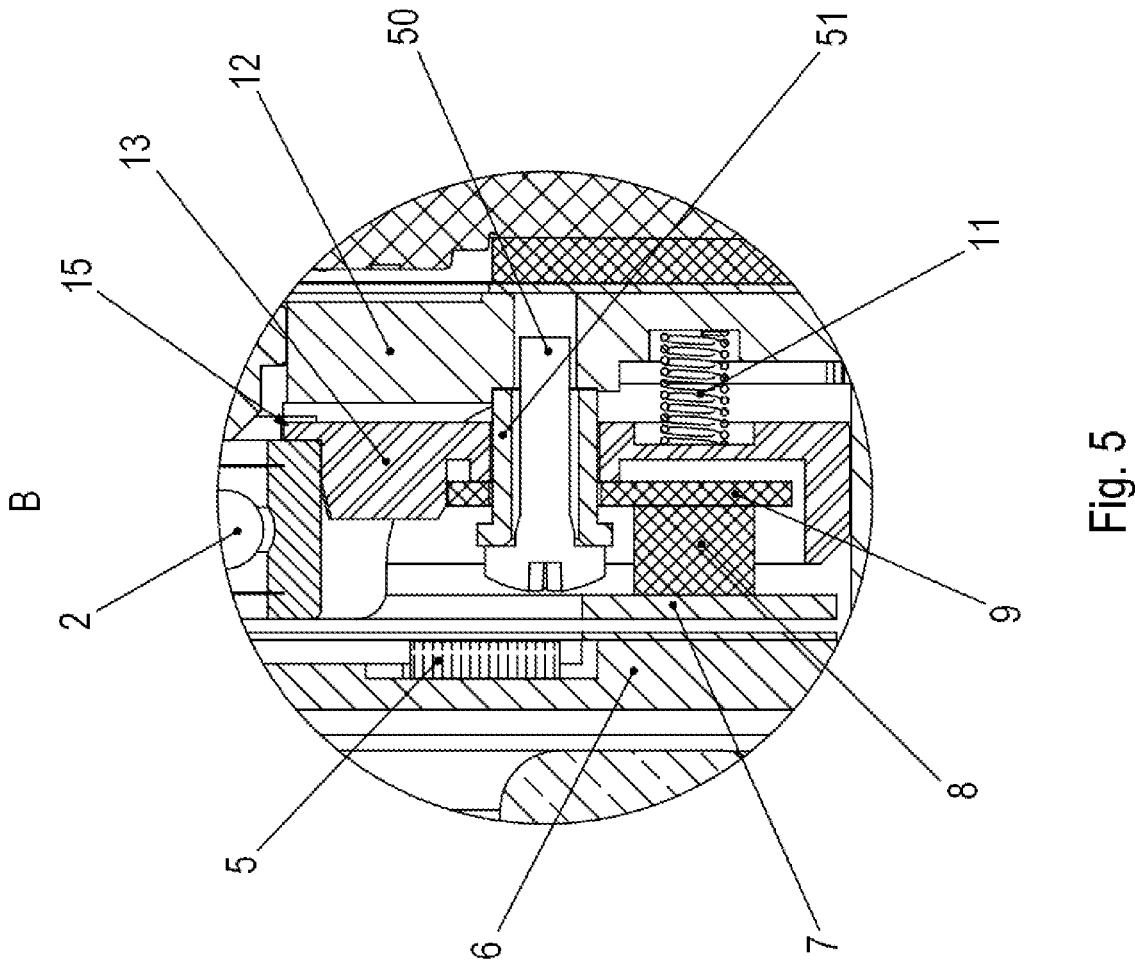
FIG. 5 illustrates an alternative guide for the printed circuit boards.
Figure 9:
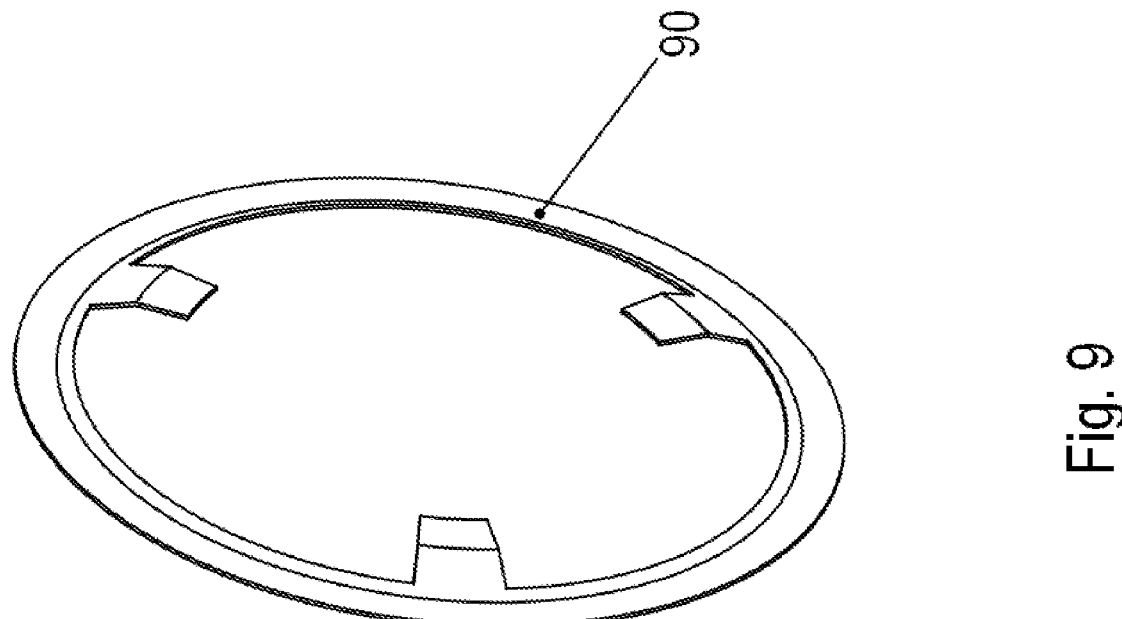
FIG. 9 illustrates a shaped spring as an alternative to the spring elements.

According to example embodiments, a sliding bush 51 is arranged on the screw as a guide for the first printed circuit board 9, as illustrated in FIG. 5. Alternatively, the guide can also be arranged as a shaped spring, so that the separate spring element 11 is also omitted. Such a shaped spring 90 is illustrated in FIG. 9 and also replaces the spring elements 11. For example, there is also no need for guiding by sliding bushes 52 or the like, since the shaped spring 90 applies the elastic compressive force evenly distributed around the circumference to the alignment element 13 and, for example, supports itself on the housing part 12.

Figure 10:
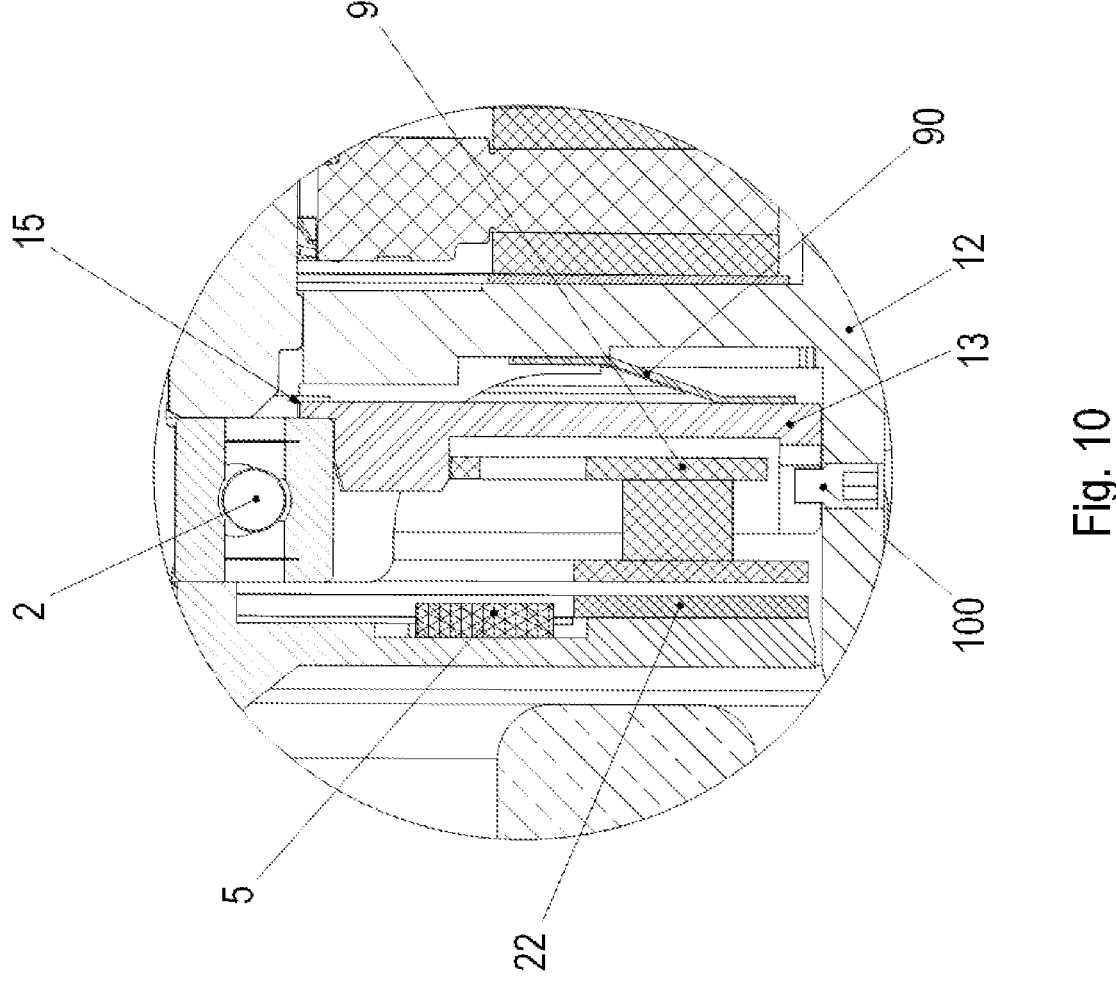
FIG. 10 illustrates shows an example embodiment with such a shaped spring.

As illustrated in FIG. 10 as a further embodiment example, a screw 100, which can also be arranged as a pin, is passed through the housing part 12 from the outside and protrudes into a corresponding recess of the alignment element 13. The alignment element 13 is thus secured in a form-locking manner in the circumferential direction and is also delimited in the axial direction, since the screw 100 is also arranged as an axial limit. The shaped spring 90 thus presses the alignment element 13 against the outer ring of the bearing 2, in which the maximum axial play is defined by the screw 100.

In example embodiments, the respective alignment element also bears against and makes contact with the radial outer surface, so that the radial position of the first printed circuit board 9 can also be precisely determined. The other guiding can also be omitted or would be overdetermined.

In example embodiments, the axial guiding is effected by, e.g., three, bushes spaced apart from one another in the circumferential direction, which bushes are received in the housing part 12 in a form-fitting manner, e.g., by flat counterbores. The concentric and coaxial alignment of the alignment element 13 is effected by the outer ring of the bearing. One of these bushes is guided in the housing part 12 with little play, thus ensuring the most precise torsional or torque support possible.

LIST OF REFERENCE NUMERALS

1 Stator housing part
2 Bearing
3 Tappet
4 Rotor shaft
5 Permanent magnet
6 Plate part, e.g., turntable
7 Second printed circuit board
8 Spacer element
9 First printed circuit board
10 Guide part
11 Spring element
12 Housing part
13 Alignment element, e.g., support part
14 Retaining ring
15 Tongue region of the alignment element 13
16 Manual release lever of the brake
17 Coil
18 Magnetic body
19 Armature disk
20 Brake pad carrier
21 Cover, e.g., fan cover
22 Circuit board
40 Screw
41 Impulse sensor, e.g., Wiegand sensor
50 Screw
51 Sliding bush
90 Shaped spring

The invention claimed is:

1. An electric motor, comprising: a housing part including a bearing seat; a bearing arranged in the bearing seat; a rotor shaft, an inner ring of the bearing being arranged on the rotor shaft; an angular position sensor including a first printed circuit board and an alignment element, the first printed circuit board being received in the alignment element; a spring element supported on the housing part and pressing onto the alignment element, at least one tongue region of the alignment element that is connected to the first printed circuit board bears against an outer ring of the bearing.

2. The electric motor according to claim 1, wherein the bearing is arranged as a floating bearing, the outer ring of the bearing being received in the bearing seat, the inner ring of the bearing being fixed in an axial direction on the rotor shaft.

3. The electric motor according to claim 2, wherein the inner ring of the bearing is fixed in the axial direction on the rotor shaft by a shaft collar and a retaining ring.

4. The electric motor according to claim 1, wherein the spring element includes an annular spring, a leaf spring, a shaped spring, and/or a metal bellows.

5. The electric motor according to claim 1, wherein the bearing seat is interrupted in a circumferential direction, so that at least one tongue region projects radially through an interrupted region of the bearing seat.

6. The electric motor according to claim 5, wherein the bearing seat is interrupted at a plurality of points in the circumferential direction, so that a respective tongue region projects radially through a respective interrupted region.

7. The electric motor according to claim 5, wherein the bearing seat is interrupted at a plurality of points in the circumferential direction.

8. The electric motor according to claim 1, wherein the first printed circuit board is arranged as a ring.

9. The electric motor according to claim 8, wherein a ring axis of the ring is aligned coaxially with an axis of rotation of the rotor shaft.

10. The electric motor according to claim 1, wherein a direction of a normal of the printed circuit board plane is aligned parallel to an axis of rotation of the rotor shaft.

11. The electric motor according to claim 1, wherein the first printed circuit board is received in the alignment element, the alignment element including a plurality of tongue regions spaced apart from one another in a circumferential direction, each tongue regions bearing against the outer ring of the bearing.

12. The electric motor according to claim 1, wherein the alignment element is connected to the first printed circuit board by at least one screw.

13. The electric motor according to claim 1, wherein the alignment element is connected to the first printed circuit board by at least one screw, by the screw being screwed into the alignment element and/or by the screw being arranged through the alignment element and screwed into a nut that bears against the alignment element.

14. The electric motor according to claim 13, wherein a screw head of the screw presses onto the first printed circuit board and/or bears against the first printed circuit board on a side of the first printed circuit board facing away from the part.

15. The electric motor according to claim 1, wherein a region covered by the first printed circuit board in an axial direction overlaps a region covered by the bearing in the axial direction.

16. The electric motor according to claim 1, wherein the first printed circuit board is radially spaced apart from the bearing.

17. The electric motor according to claim 1, wherein the bearing seat is interrupted in a circumferential direction, so that a respective tongue region projects radially through a respective interrupted region.

18. The electric motor according to claim 17, wherein the respective tongue region has a respective spatial region available for movement in an axial direction.

19. The electric motor according to claim 1, wherein the spring element is arranged as a guide for the alignment element and/or for the first printed circuit board.

20. The electric motor according to claim 1, wherein a screw screwed into the housing part protrudes at least partially into a recess in the alignment element and is arranged as a guide for the alignment element and/or for the first printed circuit board.

21. The electric motor according to claim 1, wherein a sliding bush arranged on a screw screwed into the housing part is arranged as a guide for the first printed circuit board.

22. The electric motor according to claim 1, further comprising:

a second printed circuit board arranged in the form of a ring connected to the first printed circuit board;

a spacer element arranged between the first printed circuit board and the second printed circuit board, the first printed circuit board being arranged parallel and coaxial to the second printed circuit board.

23. The electric motor according to claim 1, wherein a plate part arranged on the rotor shaft bears against a shaft shoulder of the rotor shaft, the inner ring bearing against the plate part on a side of the plate part facing away from the shaft shoulder, the inner ring being axially delimited by a retaining ring arranged in an annular groove of the rotor shaft and/or the inner ring being axially delimited by a retaining ring arranged in an annular groove of the rotor shaft via a tappet arranged axially between the inner ring and the retaining ring and connected to the rotor shaft in a rotationally fixed manner, the retaining ring bearing against the tappet and the tappet bearing against the inner ring.

24. The electric motor according to claim 23, wherein the inner ring of the bearing, together with the plate part, is arranged on the rotor shaft and, in relation to an axis of rotation of the rotor shaft, is fixed in an axial direction on the rotor shaft by a shaft collar and a retaining ring.

25. The electric motor according to claim 23, wherein the plate part is arranged as a turntable and/or as a rotating body.

26. The electric motor according to claim 25, wherein an annular gap is arranged between the housing part and the plate part.

27. The electric motor according to claim 23, wherein the plate part has a coding detectable by a sensor arranged on the first printed circuit board and/or the plate part receives, in an axial recess, a coding disk, a coding of the coding disk being detectable by a sensor arranged on the first printed circuit board.

28. The electric motor according to claim 23, wherein the plate part is made of a ferromagnetic material, a soft magnetic material, and/or aluminum.

29. The electric motor according to claim 23, wherein a permanent magnet is fastened to the plate part.

30. The electric motor according to claim 23, wherein the housing part and at least one stator housing part enclose an interior region that includes a stator winding of the electric motor in a housing-forming manner, the interior region also including the plate part and the first printed circuit board, without an interposed seal between the stator winding and the first printed circuit board.

31. The electric motor according to claim 23, wherein a braking surface is arranged on the housing part on a side of the housing part facing away from the plate part in an axial direction and/or is arranged on a metal part and/or a sheet metal part connected to the housing part.

32. The electric motor according to claim 23, wherein a brake pad carrier is connected to the tappet in a rotationally fixed and axially displaceable manner, a magnetic body receiving a coil is connected to the housing part in a rotationally fixed manner, an armature disk is connected to the magnet body in a rotationally fixed and axially displaceable manner, the armature disk is arranged in the axial direction between the brake pad carrier and the magnet body, further spring elements supported on the magnet body press on the armature disk.

33. The electric motor according to claim 32, wherein the electric motor is configured so that, in response to the coil being energized, the armature disk is pulled toward the magnet body against a spring force generated by the further spring elements, and, in response to the coil not being energized, the armature disk is pressed by the further spring elements onto the brake pad carrier, which is pressed onto the braking surface, so that braking occurs.

34. The electric motor according to claim 1, wherein the rotor shaft protrudes through a magnet body and is connected to a fan wheel in a rotationally fixed manner.

35. The electric motor according to claim 1, wherein an impulse wire sensor and/or a Wiegand sensor is arranged on the first printed circuit board.

36. The electric motor according to claim 35, wherein a distance between a plate part and the impulse wire sensor and/or the Wiegand sensor is arranged so that a rotation of a permanent magnet past the impulse wire sensor and/or the Wiegand sensor is detectable by the impulse wire sensor and/or the Wiegand sensor.

\*　\*　\*　\*　\*